United States Patent [19]

Ganss

[11] Patent Number: 4,641,177
[45] Date of Patent: Feb. 3, 1987

[54] PROCESS AND DEVICE FOR PRODUCING A SCREEN IMAGE WITH A THREE-DIMENSIONAL EFFECT IN A TELEVISION RECEIVER

[76] Inventor: Rolf Ganss, Mexicoring 7, 2000 Hamburg 60, Fed. Rep. of Germany

[21] Appl. No.: 809,844

[22] Filed: Dec. 16, 1985

Related U.S. Application Data

[63] Continuation of Ser. No. 476,587, Mar. 18, 1983, abandoned.

[30] Foreign Application Priority Data

Mar. 19, 1982 [DE] Fed. Rep. of Germany ....... 3210089
May 8, 1982 [DE] Fed. Rep. of Germany ....... 3217849

[51] Int. Cl.$^4$ ............................................. H04N 15/00
[52] U.S. Cl. ......................................... 358/3; 358/89
[58] Field of Search ............... 358/3, 89, 88; 340/703, 340/729; 364/522

[56] References Cited

U.S. PATENT DOCUMENTS 2,865,988 12/1958 Cafarelli ................................ 358/89
4,151,549 4/1979 Bautze ................................... 358/3
4,264,926 4/1981 Etra ...................................... 358/91

FOREIGN PATENT DOCUMENTS 1164467 9/1964 Fed. Rep. of Germany .
1168761 11/1964 Fed. Rep. of Germany .
700982 12/1953 United Kingdom .
815969 3/1981 U.S.S.R. .............................. 358/3

Primary Examiner—Michael A. Masinick
Attorney, Agent, or Firm—Harness, Dickey & Pierce

[57] ABSTRACT

A process for producing a television receiver screen image which appears three-dimensional when viewed through anaglyphic eye glasses, the image being produced from monoscopic image signals representing monoscopic images in timed sequence, by superimposing two partial images which are mutually offset by a selected partial image distance, in complementary colors matched with the anaglyphic eye glasses, each of the partial images being derived in the form of a color excerpt from each the same monoscopic image.

24 Claims, 2 Drawing Figures

PROCESS AND DEVICE FOR PRODUCING A SCREEN IMAGE WITH A THREE-DIMENSIONAL EFFECT IN A TELEVISION RECEIVER

This application is a continuation of application Ser. No. 476,587, filed Mar. 18, 1983 now abandoned.

BACKGROUND OF THE INVENTION

When transmitting conventional sterescopic television programs (so-called "3D television"), genuine sterescopic partial images are produced by means of two laterally offset cameras in the complementary colours red and green and are viewed with usual red/green anaglyphic eye glasses as a stereoscopic black-and-white image. With this known process, strong blurring and very disturbing colour spots and colour fringes occur in out-of-focus image areas. Only a black and white image impression is obtained. The observer rapidly becomes tired, particularly with moving scenes. Thus, an observer often would prefer to see the program without anaglyphic eye glasses; that, however, is only possible with a strong loss of image quality because only a very unsharp image impression is possible without anaglyphic eye glasses.

With all genuine stereoscopic processes, the expense for the production of the programs is considerable. Already available monoscopic records can be observed only as such.

In another known process of displaying television images which is applicable also to already available monoscopic pictures (U.S. Pat. No. 4,264,926), the aim is to utilize a disparity between two monoscopic pictures taken at different times for obtaining the impression of a three-dimensional image.

However, the storing of the past image in a colour television receiver requires a very high expense. The result is unsatisfactory because the desired success can be obtained only if the moving elements of the scene move at a definite speed in a definite horizontal direction (with a normal attitude of the head of the observer).

Furthermore, is has been known for quite a time that a three-dimensional image impression can be obtained also with partial image which are derived from the same monoscopic image. That principle has been described not only for purely optical devices (Belgian patent letter No. 535 959) but also for television receivers. According to the U.S. Pat. No. 4,151,549, a projection colour television receiver is employed which comprises three projectors, one each for three basic colours. Means (not decribed in detail) are provided to selectively offset one of the produced projected partial images with respect to the other partial image. The mutually offset partial images are separately viewed through polarization filters. That process is very expensive and not suited for the vast majority of receiving apparatuses which operate without means for projection, or with a single projector only.

A known process of the kind initially set forth (German Auslegeschrift No. 1 164 467) operates in a similar manner In that process, two beam generating systems of a two beam picture tube, which systems write in complementary colours, are controlled with one and the same black and white image signal, and the partial images produced by the two beams are mutually laterally offset by means of a control device which has not been described in detail. That proposal did not find acceptance in practice, presumably for the reason that the mutual offsetting of the partial images involved difficulties. The present invention proceeds from that part of the known process. The known process, however, still employs additionally a non-linear contrary distortion of the time deflections of the two beams in order to make the two partial images perspectively different and to thus amplify the impression of a three-dimensional image. However, since the additional stereoscopic effect thus created can at best be randomly now and then be in accordance with the actual perspective of the image scene, a satisfactory impression of a three-dimensional picture cannot result in this manner. However, that additional feature reflects the belief that in view of the unsatisfactory effectiveness of the genuine stereoscopic television processes mentioned initially, it had to be considered a devious idea to simply employ a pseudo-stereoscopic process from which a further reduction of the standard had to be fairly expected.

OBJECTS OF THE INVENTION

It is the object of the invention to provide a process and an apparatus for producing a screen image of a television receiver which gives a three-dimensional impression when viewed through anaglyphic eye glasses, which process and device are also applicable to already available monoscopic records, require only very little expense, and yet result in a three-dimensional image impression of high quality.

To attain that object, the invention proceeds from the last-described process of the kind initially indicated.

According to the invention, the object is attached with respect to the process by a process of the kind initially indicated, which process is characterized in that the partial image distance is created by mutually time-delaying the partial image signals which produce the associated partial images.

In the process according to the invention, the mutual lateral offset of the partial images is produced very simply by delaying partial image signals in time. This can be achieved with simple means and at least expense, and this even subsequently in already available devices. Neither the storing and processing of a complete content of a picture, nor a modification of the deflection geometry of the beams writing the partial images are required. Furthermore, a switching between operation with and without application of a process according to the invention can be obtained with simple means. Such a switchability is very appropriate in order that the screen image may also be desirably viewed without anaglyphic eye glasses (and without a three-dimensional impression).

Since the process according to the invention basically proceeds from a monoscopic image or a monoscopic image signal, no stereoscopic recording devices of any kind are necessary, and an application on already available monoscopic records is readily possible. All monoscopic sources of picture informations can be used, including particularly also, for instance, usual monoscopic television cameras, as well as already available monoscopic image as photographic films, video records, prints and slides, etc. No additional preparation or pre-processing of such records is necessary. This constitutes a very essential advantage of the process according to the invention.

Of particular simplicity is a preferred embodiment according to which a three beam colour picture tube operated in the usual manner is employed to produce the screen image, which tube is controlled by a set of basic colour signals contained in the image signal, and in that for forming the partial image signals, the set of the three basic colour signals which partial sets are mutually time-delayed in correspondence with the selected partial image distance. The subdivision of the basic colour signals, and the time delay can be achieved electrically with very simple means because this involves only the processing and delaying of signal trains. As compared with conventional colour television receivers, only very slight modifications are necessary which do not require complicated circuitry and can be effected easily and without difficulties also in already available colour television receivers.

In general, two partial image signals will be sufficient in the process according to the invention, because these are basically sufficient and necessary to produce a real three-dimensional image impression. It is, however, also possible to form and process more than two partial image signals in order to obtain particular effects as for instance coloured shadows.

It is particularly advantageous if the set of the basic colour signals is subdivided, and correspondingly designed anaglyphic eye glasses are employed, such that the partial images have full complementarity, i.e. upon being viewed combine to form an image in substantially the original colours. This advantageous effect can be obtained in a simple manner by subdividing the set of basic colour signals to be matched with anaglyphic eye glasses in which the spectral ranges of the light passing through the two filter glasses of the spectacles overlap as little as possible and as far as possible include the whole visible spectrum. In this connection, it is particularly appropriate to make the subdivision matching with anaglyphic eye glasses in which the one filter glass transmits a central range of the spectrum, essentially yellow, green, and blue, and the other filter glass transmits the marginal ranges of the visible spectrum, essentially red, orange, violet, and purple. This subdivision will result in a particularly perfect reconstitution of the original colour impression. This subdivision and subsequent reconstitution is hereinafter referred to in both the specification and claims as "full complementarity". If the transmission ranges of the filter glasses overlap with each other, the viewer may more easily become tired. According to modern technology, filter glasses are available which have sharply separated broad transmission ranges.

The coloured reproduction essentially in the original colours contributes substantially to the fact that surprisingly, screen images can be produced with the present process which show a convincing three-dimensional image impression of high quality, and this even if partial images of identical perspective are used, i.e. no expense whatsoever is required to produce artificially a perspective disparity of the partial images. More particularly, the viewer also gets a correct impression of the distribution of the elements of the scene as to depth. According to present understanding, this surprising phenomenon might be due to an instinctive involving of empiric knowledge, for instance on the apparent magnitude of objects when arranged in different depths of the scene. This may also explain that with the process according to the invention, the three-dimensional impression is distinctive and correct also with static scenes. This advantageous contribution of instinctive psycho-physiological influences is strongly favoured by associating the partial images with the anaglyphic eye glasses so that the impression of an image on the other side of the screen will be created for the observer. Then, the observer means to look into a space bordered by the edge of the screen, in which the elements of the scene are arranged with a natural impression of depth. In the inverse case, i.e. with an association at which the image would be apparently positioned before the screen, the said unintentional influences could not come fully into play, probably for the reason that normally, an observer does not have any extended experience with freely floating images.

When being viewed, the screen images made with the present process are everywhere of essentially the same quality as corresponding monoscopic images. Particularly, also blurred image areas can be viewed with a natural impression and without the occurrance of disturbing colour fringes. Moving image elements are viewed as well as with monoscopic observation, i.e. particularly also without disturbing colour fringes, independently of their speed.

It is easily possible to mutually match the subdivision of the basic colour signals and the transmission characteristic of the filter glasses of the anaglyphic eye glasses because selected proportions of the basic colour signals can be easily derived and combined electrically. Particularly in this respect, advantage is taken of the fact that the lateral offset of the partial images can be obtained by an electronic delay in a signal conduit, without requiring the storing of a complete past picture.

With the basic colours employed with the usual television systems, the set of the basic colour signals can be subdivided simply so that a first partial set is provided in the form of one of the basic colour signals, and a second partial set is provided in the form of the two other basic colour signals. Then, it is not necessary to subdivide the individual basic colour signals. In the case of basic colour signals for red, green, and blue corresponding to usual standards, it is appropriate to provide the first partial set in the form of the basic colour signal for red, and the second partial set in the form of the basic colour signals for green and blue. These two partial sets are colour-complementary to a far degree so that it will be particularly easy in this way to satisfactorily reconstitute the original colours of the monoscopic image in the three-dimensional image impression.

A further simplification will result if one of the partial sets is left undelayed. Then, delaying means have to be provided only in the other partial set. In the said case that the first partial set corresponds to red, and the second partial set corresponds to green and blue, appropriately the partial set for red is left undelayed because then the partial images are mutually offset in the same sense as the red and green partial images in the conventional three-dimensional television. Then, the anaglyphic eye glasses used for the present process can be used also for viewing conventional three-dimensional television programs. Basically, however, also the reverse mode of operation is possible, according to which for the basic colours red, green, blue, the signal path for red is provided with delaying means. Then, the expense of circuitry is halved, but in the anaglyphic eye glasses, the filter glasses are conversely arranged as compared with the conventional three-dimensional television.

The partial image signals can be produced at any point during the processing of the original image information, and particularly already in a transmitting station. This will result in the important advantage that a modification at the colour television receiver is not necessary. The partial image signals can be also produced in a television camera. Since in television cameras, very similar as in a colour television receiver, an image surface (or a primary image) is scanned in lines, and the image signals obtained are split into basic colour signals, it is basically possible to employ similar circuits as when employing the present process at other points of a signal processing path.

It may also advantageous to produce the partial image signals in a transmission device, i.e. in a converter, a relay station, and the like. Thereby, only definite parts of a transmission range can be selectively supplied with programs processed in accordance with the invention.

In general, it will be particularly advantageous to produce the partial image signals in receivers. Only minor modifications are necessary for this purpose in the circuit of a receiver. It is readily possible to provide switching means to selectively switch the present process on and off so that the viewer may at his will decide whether he will view the usual monoscopic images without anaglyphic eye glasses, or images with a three-dimensional effect according to the present process with anaglyphic eye glasses.

The present process can be applied also in image recording and playback systems. In doing so, the partial image signals can be easily produced from one and the same monoscopic image signals when the latter are fed into a store, or when a monoscopic image signal is played back from an image store. This will require only litte expense. It is not necessary to store and process the contents of a former image.

Basically, partial image signals according to the invention can be also assembled from two equal monoscopic records because when playing back, it is easily possible to set a definite timely offset in the signal reproduction.

In accordance with the invention, an apparatus is provided for performing the process, which apparatus comprises means for processing monoscopic image signals which can be displayed as an image on an image screen, and means for at least selectively producing the image in the form of two partial images representing complementary colour excerpts of the monoscopic image and being laterally offset by a selected partial image distance; this device is characterized in that in a known-per-se circuit in which is provided a set of three basic colour signal paths for each a basic colour signal, delaying means are provided in a first partial set of the signal paths to time-delay the basic colour signal conducted through the signal path by the partial image distance. The delaying means require only very little constructive expense and can easily be designed so that the delay time is adjustable, and/or the delay means can be switched off entirely.

In general, a lateral offset of the partial images of about 1 cm is suitable for usual colour television receivers having screen widths in the range of about 25 to 50 cm. However, noticeable effects can be achieved also with smaller and greater shifts, approximately in the range from 7 to 1980 nano seconds, corresponding to an offset, depending upon the width of the image screen, between a tenth of a mm to 1.5 cm. In exceptional cases, the offset can be as large as about 10 cm. The invention will be subsequently described by means of examples in connection with the drawings.

DETAILED DESCRIPTION OF THE INVENTION

Figure 1:
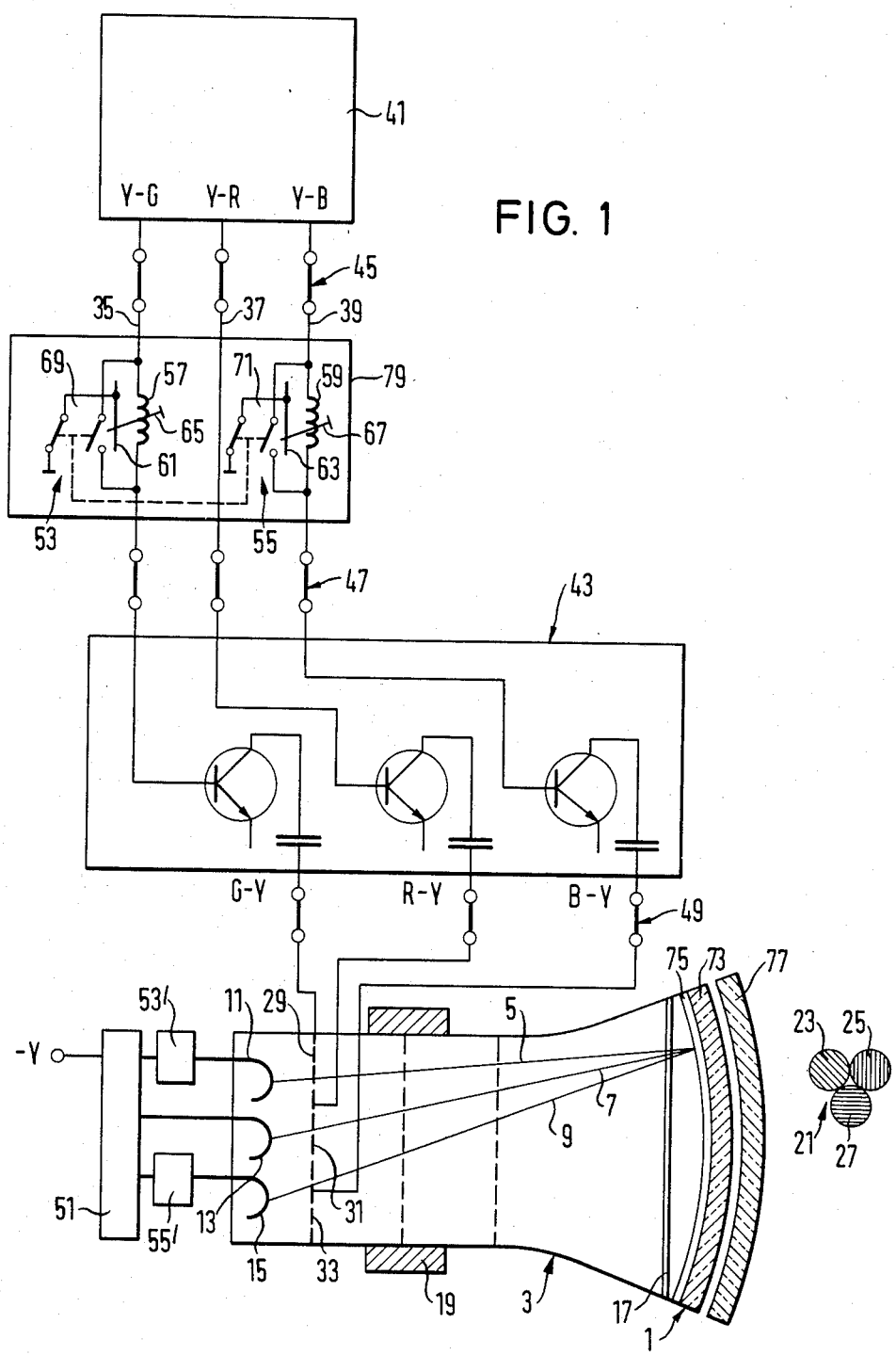
FIGS. 1 and 2 each show diagrammatically a part of a circuit of a colour television receiver having equipment in accordance with the invention.

FIG. 1 shows diagrammatically a section of a colour television receiver in which in the usual manner, for producing the screen image, an image screen 1 of a colour picture tube 3 is scanned with a set of controllable electron beams 5, 7, 9 originating in cathodes 11, 13, 15, respectively. The beams are in the usual manner converged, by means of a hole mask 17 and convergence means 19, to image points which are regularly distributed on the image screen 1. In FIG. 1, such an image point 21 is illustrated at an enlarged scale on the right hand side of the image screen 1. The beams are converged so that they impinge each image point 21 on basic colour points 23, 25, 27 which are arranged in the image points in a pattern, and are facing the beams. The basic colour points fluoresce green (23), red (25) and blue (27). The beam deflection means are not illustrated. Each beam is in the usual manner controlled with an associated basic colour signal, in the embodiment illustrated by means of the control grids 29, 31, 33, respectively. For controlling the picture tube 1, a circuit is provided which includes a set of basic colour signal paths 35, 37, 39 for each a basic colour signal. The control guide receive control voltages from a chromaticity amplifier 41 via an inverter stage 43. Between the chromaticity amplifier 41, the inverter stage 43, and the picture tube 3, plug connections 45, 47, 49, respectively, are provided. The cathodes 11, 13, 15 are controlled in known manner via a grey correction matrix 51 by a video signal (luminance) —Y which is supplied from a non-illustrated video amplifier. The control grids receive control voltages in the form of colour difference signals (chrominance signals) G-Y, R-Y, B-Y, respectively, with G, B and R being primary colour signals for green, red, and blue. In the embodiment illustrated, the basic colour signals are provided in known manner by means of colour difference signals. At the picture tube, the primary colour signals G, R, B are effective as intensity control signals for the electron beams, and are determining for the luminance of the basic colours on the image screen. Insofar, the colour television receiver is constructed in known manner. It can be readily seen that the invention is also applicable if primary colour signals are used as basic colour signals to directly control the picture tube.

In the embodiment illustrated, delaying means 53, 55 are provided in the signal paths 35 for the green colour difference signal and 39 for the blue colour difference signal, which delay these signals in time by the selected partial image distance. It will be appreciated that when controlling the picture tube with colour difference signals, as illustrated in FIG. 1, also the proportions of the basic colour signals which are fed to the cathodes have to be delayed in the same manner as the signal proportions fed to the grids. This is indicated in FIG. 1 by the symbols 53' and 55'. Delaying means of any kind may be employed. In the embodiment illustrated, inductances 57, 59, respectively, are provided together with distributed capacitances 61, 63, respectively, formed by a shield. Setting means 65 and 67, respectively, are provided for adjusting the delay time. If the delayed partial set is formed from a plurality of basic colour signals, as described above, it is normally most appropriate to design the delaying means to provide identical delay times. This is achieved in the embodiment illustrated in that the setting means 65, 67 are coupled with each other. In exceptional cases, for instance in the case of a partial set for a plurality of basic colours of strongly different physiological response times, it may be appropriate to make the delay times somewhat different from each other. This is readily possible. In practice, setting means for the delay time will not be necessary in most cases. The delay means can be selectively made ineffective by means of mutually coupled switch-off means. In FIG. 1, such switch-off means 69, 71 are illustrated at the delaying means 53, 55. By actuating the switch-off means, the viewer can at any time switch to a mode of operation without subdivision into partial images, and can then view either monoscopic programs without anaglyphic eye glasses, or conventional three-dimensional programs with anaglyphic eye glasses. These possibilities are very valuable in practice. Very important is the advantage that any monoscopic program can be selectively viewed three-dimensionally with anaglyphic eye glasses and production of partial images, or monoscopically in the conventional manner without production of partial images and without anaglyphic eye glasses.

In the embodiment illustrated, the switch-off means each consist of a double-throw switch which shorts the inductance and disconnects the distributed capacitance from ground. In order that the viewing will not be disturbed by differences between the modes of operation with and without production of partial images, it can be appropriate to couple the switch-off means with means for lowering the image brightness and/or the colour saturation and/or the contrast. Such embodiments can be readily provided by skilled people and are thus not illustrated here at detail.

The image screen 1 has, as usual, a relatively thick glass layer 73 in front of an image-producing fluorescent layer 75. It has been found that the glass layer improves considerably the effectiveness of the process, particularly if the glass layer is domed, as for instance in the manner usual with television picture tubes. Also a thickness distribution of the glass as in an optical lens, particularly a collective lens, may preferably influence the quality of the image. In order to take more advantage of this effect, it may be appropriate to additionally arrange at least one transparent pane 77 in the viewing waypath. In FIG. 1, such a pane 77 is illustrated directly in front of the image screen. It is known per se that a three-dimensional impression may arise if two optical elements which have a distorting action in two mutually perpendicular directions are arranged between a two-dimensional image and the observer (German Pat. No. 1 168 761).

Figure 2:
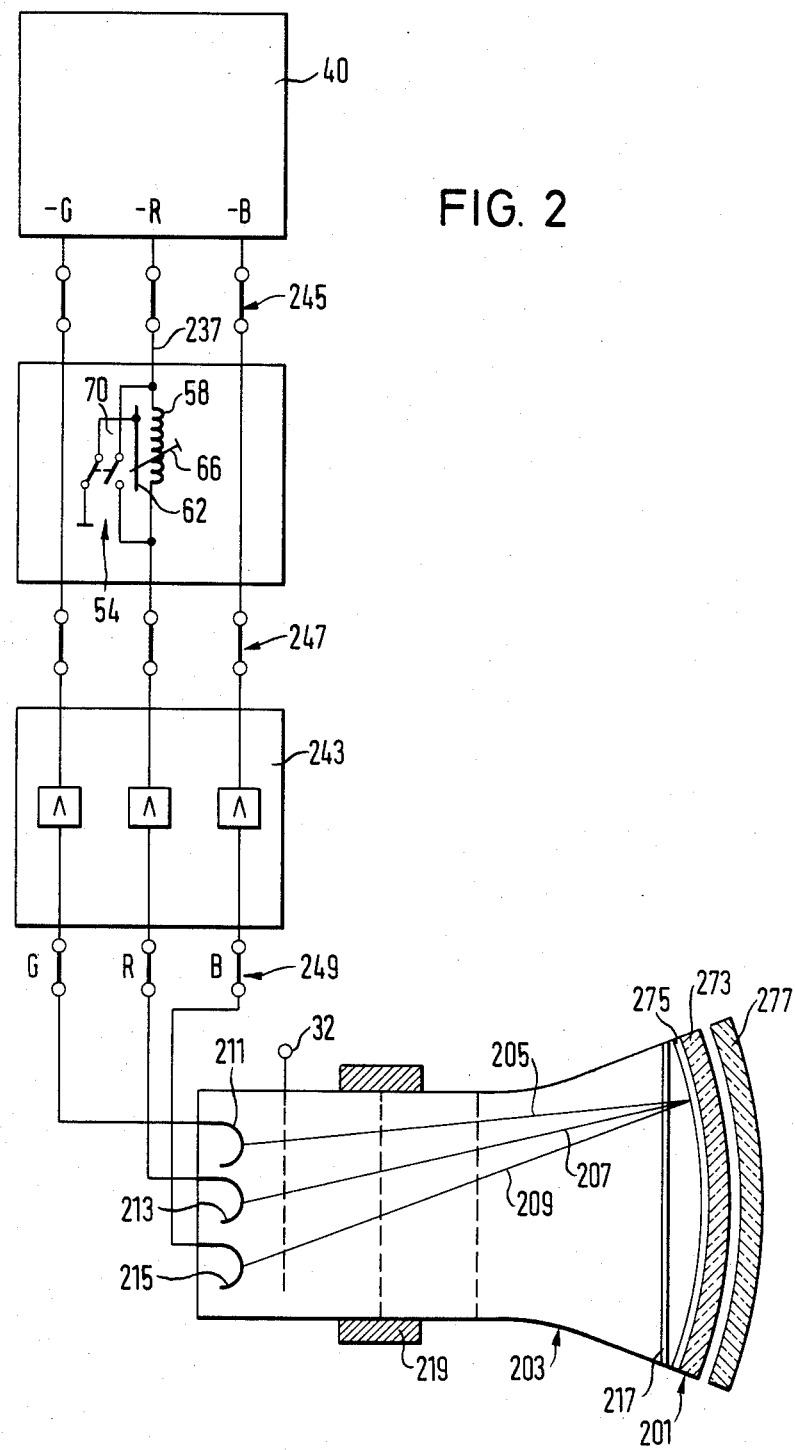

FIG. 2 shows an example of a circuit in which the picture tube is directly controlled by primary colour signals R (red), G (green), and B (blue). For parts which have similar counter parts in FIG. 1, the same reference numerals as in FIG. 1 are used but prefixed with a "2", so that reference may be made to the preceding description of FIG. 1.

According to FIG. 2, there is a colour picture tube 203 in which a set of controllable electron beams 205, 207, 209 which each come from a cathode 211, 213, 215, respectively, are controlled each with an associated basic colour signal. As basic colour signals, the primary colour signals G (green), R (red), and B (blue) are used in this case, which are fed to the cathodes 211, 213, 215, respectively. A control grid 32 provided in the colour picture tube 203 acts on all three electron beams and particularly serves for the setting of the operating point and for blanking purposes. The cathodes 211, 213, 215 receive the primary colour signals serving as control voltages from a matrix circuit 40 via inverter stages 243. Plug connections 245, 247, 249, respectively, are provided between the matrix circuit 40, the inverter stages 243, and the picture tube 203.

Delaying means 54 are provided in the signal path 237 for the red basic colour signal (primary colour signal) to timely delay this basic colour signal by the selected partial image distance. The delaying means 54 include an inductance 58 with a distributed capacitance 62. Setting means 66 are provided to adjust the delay time. The delaying means 54 can be made ineffective by switch-off means 70. In the embodiment illustrated, the switch-off means 70 consist of a double-throw switch which shorts the inductance 58 and disconnects the distributed capacitance 62 from ground.

Very particular advantages are obtained if the screen image is fixed on a carrier. Then, a permanent picture is obtained which can be viewed at any time with the anaglyphic eye glasses with a three-dimensional impression. In the most simple case, a carrier with a photographic colour film emulsion is used, and the screen image is photographed onto the carrier. In doing so, a transparent picture or a non-transparent picture can be produced on the carrier. In this manner, any monoscopic object (pictures, scenes, and the like), particularly also pictures which have already been made, can be transformed into anaglyphic pictures at very little expense. In a most simple case, the screen image is produced as an image of the monoscopic object. This can be done particularly convenient by displaying the object by means of a television camera on the image screen of a colour television receiver.

It will be seen from the preceding description that delaying means can be arranged at any point in the basic colour signal paths. Of course, points are to be preferred where the voltages and currents are low because then, the structural parts of the delaying means can be held correspondingly small. Accordingly, in the embodiment illustrated in FIG. 1, the delaying means 53 and 55 are arranged between the chromaticity amplifier 41 and the inverter stage 43 which acts as a power amplifier, i.e. in the entrance of that power stage. Because normally, a plug connection is provided between the chromacity amplifier 41 and the power stage 43, the delaying means can be designed as an inter-insertable plug-in unit. The delaying means could also, for instance, be provided in the exit of the inverter stage 43, e.g. in the plug connection 49 which is provided there. However, at this point, the operating voltages are higher than in the entrance of the inverter stage.

It will be furthermore seen that it will not make any difficulties to provide means (e.g. amplifiers) in the delaying means or at another point, by which the intensities of the basic colour signals can be adjusted relative to each other; this can be appropriate in order to obtain a complementarity as complete as possible, also with the inclusion of the anaglyphic eye glasses. This may also serve to compensate for possible signal attenuation in the delaying means.

Still further, it can be readily seen that the aforedescribed measures are applicable independently of the television standard used in a particular case; the measures described thus can be particularly used in the same manner in the NTSC, PAL or SECAM systems. Since the aforedescribed colour splitting is also employed in the transmission of black and white images in colour television apparatuses, the aforedescribed measures can also be applied with the same result in black and white programs; in such a case, the anaglyphic eye glasses will, for the viewers, combine the complementary-coloured partial images to a black and white image with a three-dimensional impression.

I claim:

1. Process for producing a television receiver screen image which appears three-dimensional when viewed through anaglyphic eye glasses, the image being produced from monoscopic image signals representing monoscopic images in timed sequence, by superimposing two partial images which are mutually offset by a selected partial image distance, in complementary colours matched with the anaglyphic eye glasses, each of the partial images being derived in the form of a different colour excerpt from each the same monoscopic image, characterized in that the partial image distance is created by mutually time-delaying the partial image signals which produce the associated partial images.

2. Process according to claim 1, in which a three beam colour picture tube operated in the usual manner is employed to produce the screen image, which tube is controlled by a set of basic colour signals contained in the image signal, and in that for forming the partial image signals, the set of the three basic colour signals is subdivided into two partial sets of basic colour signals, which partial sets are mutually time-delayed in correspondence with the selected partial image distance.

3. Process according to claim 2, characterized in that the intensities of the basic color signals are relatively modified to obtain substantial complementarity.

4. Process according to claim 2, characterized in that the screen image is fixed on a carrier.

5. Process according to claim 2, characterized in that the set of the basic colour signals is subdivided, and correspondingly designed anaglyphic eye glasses are employed, such that the partial images when being viewed combine to form an image in substantially the original colours.

6. Process according to claim 5, characterized in that the screen image is fixed on a carrier.

7. Process according to claim 5, wherein the time delay of the partial image signals is less than that of a full image distance.

8. Process according to claim 5 characterized in that a first partial set is provided in the form of one of the basic colour signals, and a second partial set is provided in the form of the two other basic colour signals.

9. Process according to claim 8, characterized in that one of the partial sets is left undelayed.

10. Process according to claim 9, characterized in that the intensities of the basic colour signals are relatively modified to obtain substantial complementarity.

11. Process according to claim 8, characterized in that the intensities of the basic colour signals are relatively modified to obtain substantial complementarity.

12. Process according to claim 2 characterized in that a first partial set is provided in the form of one of the basic colour signals, and a second partial set is provided in the form of the two other basic colour signals.

13. Process according to claim 12, characterized in that the screen image is fixed on a carrier.

14. Process according to claim 12, characterized in that one of the partial sets is left undelayed.

15. Process according to claim 14, characterized in that the intensities of the basic colour signals are relatively modified to obtain complementarity.

16. Process according to claim 15 characterized in that the screen image is fixed on a carrier.

17. Process according to claim 14, characterized in that the screen image is fixed on a carrier.

18. Process according to claim 1, wherein the time delay of the partial image signals is less than that of a full image distance.

19. Apparatus comprising means for processing monoscopic image signals which can be displayed as an image on an image screen, and means for at least selectively producing the image in the form of two partial images representing complementary colour excerpts of the monoscopic image and being offset laterally by a selected partial image distance, characterized in a circuit providing a set of three basic colour signal paths for each a basic colour signal, delaying means provided in a first partial set of the signal paths to time-delay by the partial image distance the basic colour signal conducted through the signal path.

20. Apparatus according to claim 19, characterized by means for relatively modifying the basic colour signals to obtain substantial complementarity, also including the anaglyphic eye glasses.

21. Apparatus according to claim 19, wherein the delaying means delays the partial image distance less than a full image distance.

22. Apparatus according to claim 19, characterized by switch-off means for selectively making the delaying means ineffective.

23. Apparatus according to claim 22, characterized by including means for relatively modifying the basic colour signals to obtain substantial complementarity, also including the anaglyphic eye glasses.

24. Apparatus according to claim 23, wherein the delaying means delays the partial image distance less than a full image distance.

* * * * *